United States Patent
Colarusso

(10) Patent No.: US 12,046,156 B2
(45) Date of Patent: Jul. 23, 2024

(54) UNSUPERVISED MACHINE SCORING OF FREE-RESPONSE ANSWERS

(71) Applicant: Suffolk University, Boston, MA (US)

(72) Inventor: David A. Colarusso, Boston, MA (US)

(73) Assignee: SUFFOLK UNIVERSITY, Boston, MA (US)

( * ) Notice: Subject to any disclaimer, the term of this patent is extended or adjusted under 35 U.S.C. 154(b) by 645 days.

(21) Appl. No.: 17/246,563

(22) Filed: Apr. 30, 2021

(65) Prior Publication Data
US 2021/0343174 A1    Nov. 4, 2021

Related U.S. Application Data

(60) Provisional application No. 63/019,201, filed on May 1, 2020.

(51) Int. Cl.
*G09B 7/00* (2006.01)
*G06F 18/22* (2023.01)
(Continued)

(52) U.S. Cl.
CPC ............... *G09B 7/02* (2013.01); *G06F 18/22* (2023.01); *G06F 40/30* (2020.01)

(58) Field of Classification Search
CPC ...................................................... G09B 7/00
(Continued)

(56) References Cited

U.S. PATENT DOCUMENTS 6,181,909 B1 * 1/2001 Burstein .................. G09B 7/00
434/350
6,366,759 B1   4/2002 Burstein et al.
(Continued)

FOREIGN PATENT DOCUMENTS

WO    2006093928 A2    9/2006

OTHER PUBLICATIONS

Semire Dikli, "Automated Essay Scoring", The Turkish Online Journal of Distance Education, Jan. 2006, 14 Pages, vol. 7, No. 1, Article 5.
(Continued)

*Primary Examiner* — Kurt Fernstrom
(74) *Attorney, Agent, or Firm* — Talem IP Law, LLP

(57) ABSTRACT

Unsupervised machine scoring of free-response answers can be provided, eliminating the need to create a model answer. A scoring system can receive a set of free-response answers with associated response content and determine, from all the associated response content, a commonality content by identifying semantically related response content from the set of free-response answers. For each free-response answer, the scoring system can determine an amount of similarity between the associated response content for that free-response answer and the commonality content and assign a similarity value from the amount of similarity to that free-response answer. The amount of similarity indicates a degree of "correctness" of an answer and, according to an implementation, can be considered to be the distance of an embedding of a free-response answer from a vector-related average of all the free-response answers. The scoring system can provide the set of free-response answers and the corresponding assigned similarity values.

8 Claims, 15 Drawing Sheets

(51) Int. Cl.
  *G06F 40/30* (2020.01)
  *G09B 7/02* (2006.01)

(58) Field of Classification Search
  USPC .................................................. 434/353, 354
  See application file for complete search history.

(56) References Cited

U.S. PATENT DOCUMENTS

| | | | |
|---|---|---|---|
| 7,088,949 | B2 | 8/2006 | Burstein et al. |
| 7,099,819 | B2* | 8/2006 | Sakai .................... G06F 16/353 |
| | | | 707/E17.09 |
| 7,711,312 | B2 | 5/2010 | Higgins et al. |
| 7,729,655 | B2 | 6/2010 | Burstein et al. |
| 8,380,491 | B2* | 2/2013 | Leacock ............ G06F 16/3347 |
| | | | 434/335 |
| 8,452,225 | B2 | 5/2013 | Burstein et al. |
| 8,472,861 | B2 | 6/2013 | Andreyev et al. |
| 9,646,250 | B1 | 5/2017 | Indurthi et al. |
| 9,679,256 | B2 | 6/2017 | Briscoe et al. |
| 10,467,268 | B2 | 11/2019 | Fan et al. |
| 2005/0137849 | A1* | 6/2005 | Parkinson ............. G06F 40/216 |
| | | | 704/4 |
| 2005/0142529 | A1 | 6/2005 | Andreyev et al. |
| 2006/0286540 | A1 | 12/2006 | Burstein et al. |
| 2008/0126319 | A1* | 5/2008 | Bukai .................... G06F 16/951 |
| 2010/0191686 | A1* | 7/2010 | Wang .................... G06F 16/334 |
| | | | 707/E17.014 |
| 2010/0297596 | A1 | 11/2010 | Burstein et al. |
| 2011/0244434 | A1* | 10/2011 | Livne .................. G09B 19/025 |
| | | | 434/188 |
| 2011/0270883 | A1 | 11/2011 | Bukai et al. |
| 2012/0189991 | A1* | 7/2012 | Smith ..................... G09B 7/02 |
| | | | 434/201 |
| 2013/0004931 | A1* | 1/2013 | Attali ..................... G09B 7/02 |
| | | | 434/353 |
| 2013/0302775 | A1* | 11/2013 | King ..................... G09B 7/00 |
| | | | 434/362 |
| 2016/0170989 | A1 | 6/2016 | Bishop et al. |
| 2017/0364519 | A1 | 12/2017 | Beller et al. |
| 2020/0005157 | A1 | 1/2020 | Rosenstein et al. |

OTHER PUBLICATIONS

Manvi Mahana et al., "Automated Essay Grading Using Machine Learning", CS229 Machine Learning, Autumn 2012, 5 Pages, Stanford University.

V. V. Ramalingam et al., "Automated Essay Grading Using Machine Learning Algorithm", National Conference on Mathematical Techniques and its Applications (NCMTA 18), IOP Conf. Series: Journal of Physics: Conf. Series 1000, 2018, 8 Pages, IOP Publishing Ltd.

Peter Greene, "Automated Essay Scoring Remains an Empty Dream", Jul. 2, 2018, 5 Pages, Retrieved from: https://www.forbes.com/sites/petergreene/2018/07/02/automated-essay-scoring-remains-an-empty-dream/?sh=70226bde74b9.

Shihui Song et al. "Automated Essay Scoring Using Machine Learning", CS224N Final Project, Retrieved on: Apr. 13, 2020, 6 Pages, Retrieved from: https://nlp.stanford.edu/courses/cs224n/2013/reports/song.pdf.

"Automated Essay Scoring, Project Essay Grade (PEG)", 2018, 4 Pages, Retrieved from: https://www.measurementinc.com/products-services/automated-essay-scoring.

"Write to Learn", Retrieved on: Apr. 13, 2020, 2 Pages, Retrieved from: https://www.pearsonassessments.com/store/usassessments/en/Store/Professional-Assessments/Academic-Learning/WriteToLearn/p/100000030.html.

Jiawei Liu et al., "Automated Essay Scoring Based on Two-Stage Learning", Dec. 20, 2019, 7 Pages.

\* cited by examiner

| Exam 1 | | |
|---|---|---|
| QUESTIONS | RESPONSES | |
| 504 → Question 1 | 15 RESPONSES | Grade — 540 |
| 506 → Question 2 | 15 RESPONSES | Grade — 542 |
| 516 → Question 3 | 15 RESPONSES | Grade — 544 |
| 524 → Question 4 | 15 RESPONSES | Grade — 546 |
| | | Grade All — 548 |

FIG. 5E

Exam 1

QUESTIONS      RESPONSES    < Prev Q    Next Q >

516 → Question 3: What lessons are we to take from the tale of Abraham Wald?

| Student | Score | Comments |
|---|---|---|
| Student 1 | 91 | |
| Student 2 | 87 | |
| Student 3 | 83 | |
| Student 4 | 90 | |

Sort 570

Convert 572

FIG. 5H

Exam 1

QUESTIONS      RESPONSES

| Student | Q1 | Q2 | Q3 | Q4 | Exam Score |
|---|---|---|---|---|---|
| Student 1 | 92 | 95 | 91 | 98 | 94 |
| Student 2 | 83 | 86 | 87 | 90 | 87 |
| Student 3 | 75 | 80 | 83 | 81 | 80 |
| Student 4 | 95 | 93 | 90 | 97 | 94 |
| Student 5 | 87 | 90 | 88 | 86 | 88 |

Sort 570

Convert 572

FIG. 5I

|             | Exam 1 Score |         |
|-------------|--------------|---------|
|             | Score        | Comment |
| 504 → Question 1 | 91 | |
| 506 → Question 2 | 90 | |
| 516 → Question 3 | 83 | |
| 524 → Question 4 | 87 | |
| 580 → Overall Score | 88 | |

Review Answers 590

FIG. 6E

Exam 1

QUESTIONS    RESPONSES

*700*

Upload Answers
*705*

Exam 1

QUESTIONS    RESPONSES

710 → Question 1    53 RESPONSES    [Grade] — 740
715 → Question 2    53 RESPONSES    [Grade] — 742
720 → Question 3    53 RESPONSES    [Grade] — 744
725 → Question 4    53 RESPONSES    [Grade] — 746
                                    [Grade All] — 748

FIG. 7B

UNSUPERVISED MACHINE SCORING OF FREE-RESPONSE ANSWERS

CROSS-REFERENCE TO RELATED APPLICATION(S)

The present invention claims the benefit of U.S. Provisional Application Ser. No. 63/019,201, filed May 1, 2020.

BACKGROUND

Examinations are given as a formal test of a student's knowledge or proficiency in a particular subject. Examinations are a very common assessment and evaluation tool in education; and there are many types of examination questions an educator can ask on an examination, such as fixed-response questions and free-response questions.

Fixed-response questions prompt the student to select their answer from a list of possible response answers. Examples of fixed-response questions include, but are not limited to, multiple choice questions, true/false questions, matching questions, and ranking questions.

Free-response questions are distinct from fixed-response questions in that students must supply a full and independent response. There are no answer options from which to choose. Examples of free-response questions include, but are not limited to, short answer questions and essay questions. Free-response questions are often avoided from inclusion in examinations because of the difficulty, bias, and time required in grading them.

BRIEF SUMMARY

Systems and methods for providing unsupervised machine scoring of free-response answers are described. The described unsupervised machine scoring of free-response answers eliminates the need to create a model answer for an examination question. Indeed, the described systems and methods can provide unsupervised machine scoring of a set of free-response answers without the need for pre-labeled sample answers.

An unsupervised free-response scoring system ("scoring system") can receive a set of free-response answers, each comprising an associated response content; and can determine, from the associated response content of the set of free-response answers, a commonality content by identifying semantically related response content from the set of free-response answers. For each free-response answer of the set of free-response answers, the scoring system can determine an amount of similarity between the associated response content for that free-response answer and the commonality content; and can assign a similarity value from the amount of similarity to that free-response answer. The scoring system can provide the set of free-response answers and the corresponding assigned similarity values. The corresponding assigned similarity values can indicate a score for the answer, where the more similar the free-response answer is to the commonality content, the higher the grade. Thus, in this manner, the free-response answers can be graded without the need to create a model answer.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

FIGS. 5A-5I illustrate example scenarios for unsupervised machine scoring of free-response answers from the perspective of an educator and grader.

FIGS. 6A-6E illustrate example scenarios for unsupervised machine scoring of free-response answers from the perspective of a student.

FIGS. 7A and 7B illustrate another example scenario for unsupervised machine scoring of free-response answers from the perspective of an educator and grader.

DETAILED DESCRIPTION

Figure 1:
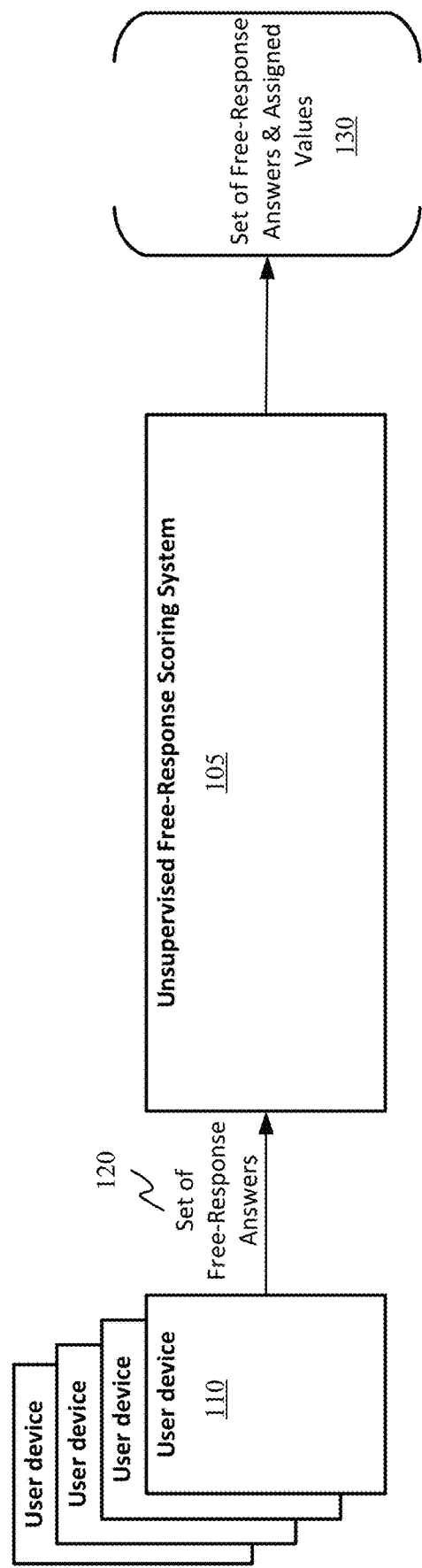
FIG. 1 illustrates an example conceptual operation of providing unsupervised machine scoring of free-response answers.

Systems and methods for providing unsupervised machine scoring of free-response answers are described. The described unsupervised machine scoring of free-response answers eliminates the need to create a model answer for an examination question. Indeed, an unsupervised free-response scoring system ("scoring system") can provide unsupervised machine scoring of a set of free-response answers without the need for pre-labeled sample answers (i.e., without the need to program, or train, the scoring system into recognizing what to look for as "correct" or "incorrect," by way of comparison to a model answer).

Advantageously, instead of requiring a model answer, the described scoring system can compare a set of free-response answers to infer the qualities a right answer ("target answer") should include, relying on the logic that "right" or "good" answers will look similar, as they will all contain the same or similar elements, and "wrong" answers will look different from "right" or "good" answers and will be "wrong" in different ways.

Grading free-response questions takes a long time, especially compared with alternatives, such as multiple-choice questions. The proliferation of online survey software has made this gap even more apparent. Such systems can easily provide students with an asynchronous assessment that they can engage with on their own schedule while providing for automatic grading. It is difficult, however, to construct good multiple-choice questions, and often they fail to measure the nuance of student understanding. Free-response questions are easier to pose, but efficient grading requires comparison with an ideal student answer.

Conventional machine-based grading of free-response answers generally requires robust examples of "right" answers, pulled from some combination of past data or sample "correct" answers. That is, there is a set of exemplar answers that are used to train a model as to what a proper answer looks like. Conventional systems for the automated scoring of free-response answer questions rely heavily on the application of supervised machine learning, requiring a set of pre-scored model answers. Functionally, this means that when an educator wants to include a free-response question on an exam, the educator must create the question and then draft what they believe a good answer to that question looks like or have some examples of good answers to that question. Then, when the students submit their answers, the machine scoring, having been trained on the model examples, would determine how similar each answer is to the model answer. Indeed, the educator must have a model answer.

When applied to grading software, current unsupervised methods tend to focus largely on the discovery of features for use in the supervised training of scoring models (e.g., the discovery of latent topics) or are used to group answers in order to assist human graders in scoring the answers. However, the unsupervised component of these approaches fails to produce insights into the correctness of answers and thus, cannot qualify as scoring. Rather, scoring is left to human graders or makes use of machine comparisons to prelabeled sample answers (i.e., supervised learning).

Consequently, current methods for the automated scoring of short answer and essay questions are poorly suited to spontaneous and idiosyncratic assessments. That is, the time saved in grading must be balanced against the time required for the training of a model. This includes tasks such as the creation of prelabeled sample answers. This limits the utility of machine grading for single classes working with novel assessments.

As an example, currently, if an educator wants to ask a question on the fly, the educator must then also create a sufficient model answer, and ideally for machine grading, there should be multiple model answers. Indeed, an educator cannot just decide to ask a question based upon the reading and class discussion and quickly have each student respond because the educator also needs to make the model answer. Thus, current machine scoring is not a tool that eliminates the burden of asking novel, idiosyncratic, free-response questions, because educators have to have the model answer.

Advantageously, the described methods and systems eliminate the need for the educator to create the model answer. The described methods can be used to help educators who are single-handedly dealing with hundreds of free-response answers every week. These constraints of having hundreds of free-response answers to grade every week severely limit the amount of time one can spend creating questions or rubrics. Additionally, various implementations of the described methods support a nimble development of free-response questions. That is, if a topic presented itself in class, an educator could easily include a new question on that topic in that week's assessment, without requiring the educator to provide a model answer for the new question.

Advantageously, the described method for unsupervised machine scoring of free-response answers does not require pre-labeled sample answers. As described herein, it is possible to provide automated scoring of free-response answers by solely having a sufficiently large set of responses to a common prompt. That is, for questions where "good" answers look similar, "wrong" answers are likely to be "wrong" in different ways. Consequently, when semantically related response content for a set of free-response answers is identified, commonality content determined from that semantically related response content can stand in for a model answer, providing a loadstar against which to measure individual responses.

"Semantically related response content" refers to content contained in at least two free-response answers that are semantically related to each other. Semantically related refers to having semantic similarity within a particular threshold. For example, it is possible that multiple words may be different, but semantically related. As an example, the words "legal," "allowable," "permissible," "lawful," "constitutional," and "statutory" are each a different word but are semantically related. As another example, the words "house," "building," "home," "dwelling," "residence," and "condo" are each different, but semantically related words. In yet another example, the words "animal," "mammal," "creature," "pet," "being," and "critter" are different words, but are semantically related.

"Commonality content" indicates a representative content that is found directly or in a semantically related form in the semantically related response content. That is, the commonality content does not have to be a particular free-response answer and may instead be a mash-up or amalgamation from the semantically related response content, a completely generated semantically related content, or even a purely mathematical construct (e.g., mathematical vector). The commonality content can be defined in vector space from word embeddings.

The described systems and methods can provide unsupervised machine scoring of free-response answers for a variety of free-response question types. For example, the described systems and methods can provide unsupervised machine scoring of free-response answers for factual free-response questions, where there is only one right answer. As another example, the described systems and methods can provide unsupervised machine scoring of free-response answers for free-response questions asked in a traditional "issue-spotting" exam. Here, the system can rank similar answers that spot the same, or similar issues as "right" or "good" answers, whereas those answer that do not spot the same, or similar, issues will be ranked lower.

Reference is made to educators and graders throughout this disclosure. It should be understood that an educator may be a grader and that the grader and educator may be the same or different individual.

Figure 2:
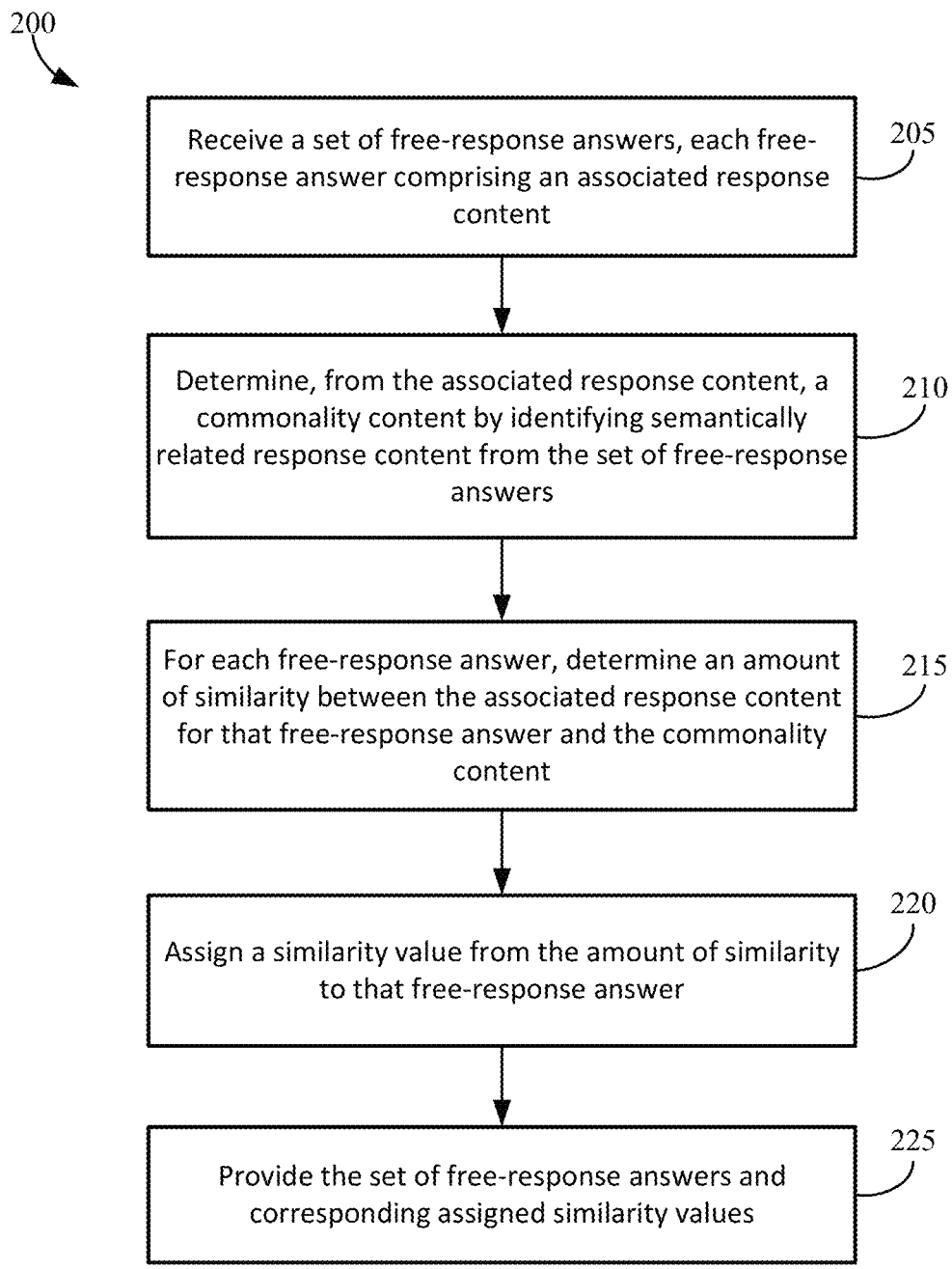
FIG. 2 illustrates an example process flow of a method for providing unsupervised machine scoring of free-response answers.

FIG. 1 illustrates an example implementation of providing unsupervised machine scoring of free-response answers; and FIG. 2 illustrates an example process flow of a method for providing unsupervised machine scoring of free-response answers.

Figure 8:
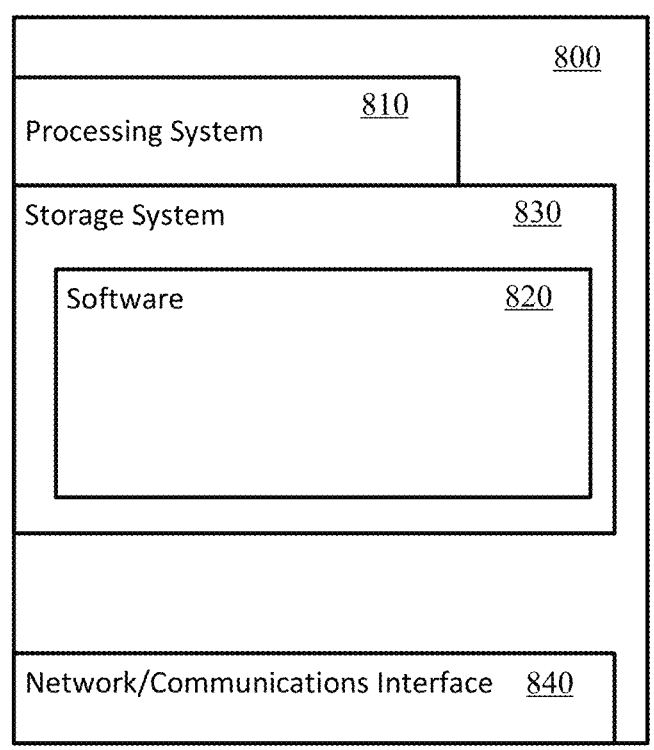
FIG. 8 illustrates components of a computing system that may be used in certain embodiments described herein.

Referring to both FIG. 1 and FIG. 2, an unsupervised free-response scoring service ("scoring service") performing processes, such as process 200 can be implemented by an unsupervised free-response scoring system ("scoring system") 105, which can be embodied as described with respect to computing system 800 as shown in FIG. 8.

It should be noted that aspects of the scoring system 105 may be implemented on more than one device. In some implementations, some aspects of the unsupervised free-response scoring are performed on a user computing device (e.g., user device 110), while other aspects may be performed, at least in part, by scoring system 105. For example, some or all of the features carried out by the scoring system 105 may be carried out at the user computing devices via an unsupervised free-response scoring component (not shown).

Some or all of process 200 may be executed at, for example, scoring system 105 as part of the scoring services (e.g., scoring system 105 may include instructions to perform process 200). In some cases, process 200 may be executed entirely at user device 110, for example as an offline version (e.g., user device 110 may include instructions to perform process 200). In some cases, process 200 may be executed at user device 110 while in communication with scoring system 105 to support the unsupervised machine scoring of free-response answers.

Referring to process 200, the scoring system 105 can receive (205) a set of free-response answers 120 from one or more user devices (e.g., user device 110). Each free-response answer of the set of free-response answers 120 can include an associated response content.

In some cases, the one or more user devices can be a user device of a student. In this case, each student can draft a free-response answer and directly communicate that free-response answer to the scoring system 105. In some cases, the one or more user devices can be a user device of an educator or designated grader. In this case, the educator (or designated grader) may collect each free-response answer in the set of free-response answers 120 and submit the set of free-response answers 120 to the scoring system 105.

The scoring system 105 can determine (210), from the associated response content of the set of free-response answers 120, a commonality content by identifying semantically related response content from the set of free-response answers 120.

The response content associated with each free-response answer includes words that are different, but semantically related. That is, multiple students can each use different words to describe the same concept. These words can be identified as semantically related response content and used to determine the commonality content.

As an example, the words "memo," "memorandum," "letter," "message," "remark," and "comment" are semantically related words. If one or more of these words were found in the response content associated with multiple free-response answers, the scoring system 105 can identify those words as semantically related response content and they can be used to determine the commonality content.

For each free-response answer of the set of free-response answers 120, the scoring system 105 can determine (215) an amount of similarity between the associated response content for that free-response answer and the commonality content and assign (220) a similarity value from the amount of similarity to that free-response answer.

The scoring system 105 can provide (225) the set of free-response answers and the corresponding assigned similarity values 130. The set of free-response answers and the corresponding assigned similarity values 130 may be provided in a variety of ways.

In some cases, the set of free-response answers and the corresponding assigned similarity values 130 can be ranked and/or sorted. For example, the set of free-response answers can be ranked and/or sorted based on varying degrees of "correctness." The ranking and/or sorting can be performed using the assigned similarity values and the logic that "right" or "good" answers will look similar, as they will all contain the same or similar elements, and "wrong" answers will look different from "right" or "good" answers and will be "wrong" in different ways.

In some cases, the corresponding assigned similarity values can be converted into other scores or other assessment metric, such as Z-scores or other standardized scores. The Z-scores can be converted into a grading scale such as conventional grades (e.g., A, A−, B+, B, B−, etc.) or a pass/fail grade or some other grading scale.

It should be understood that the ranking and/or sorting of the set of free-response answers and the conversion of the corresponding assigned similarity values may occur at the scoring system 105 before the scoring system 105 provides the set of free-response answers and the corresponding assigned similarity values 130 to a grader's system or at the grader's system after the scoring system 105 provides the set of free-response answers and the corresponding assigned similarity values 130 to the grader's system.

Figure 3:
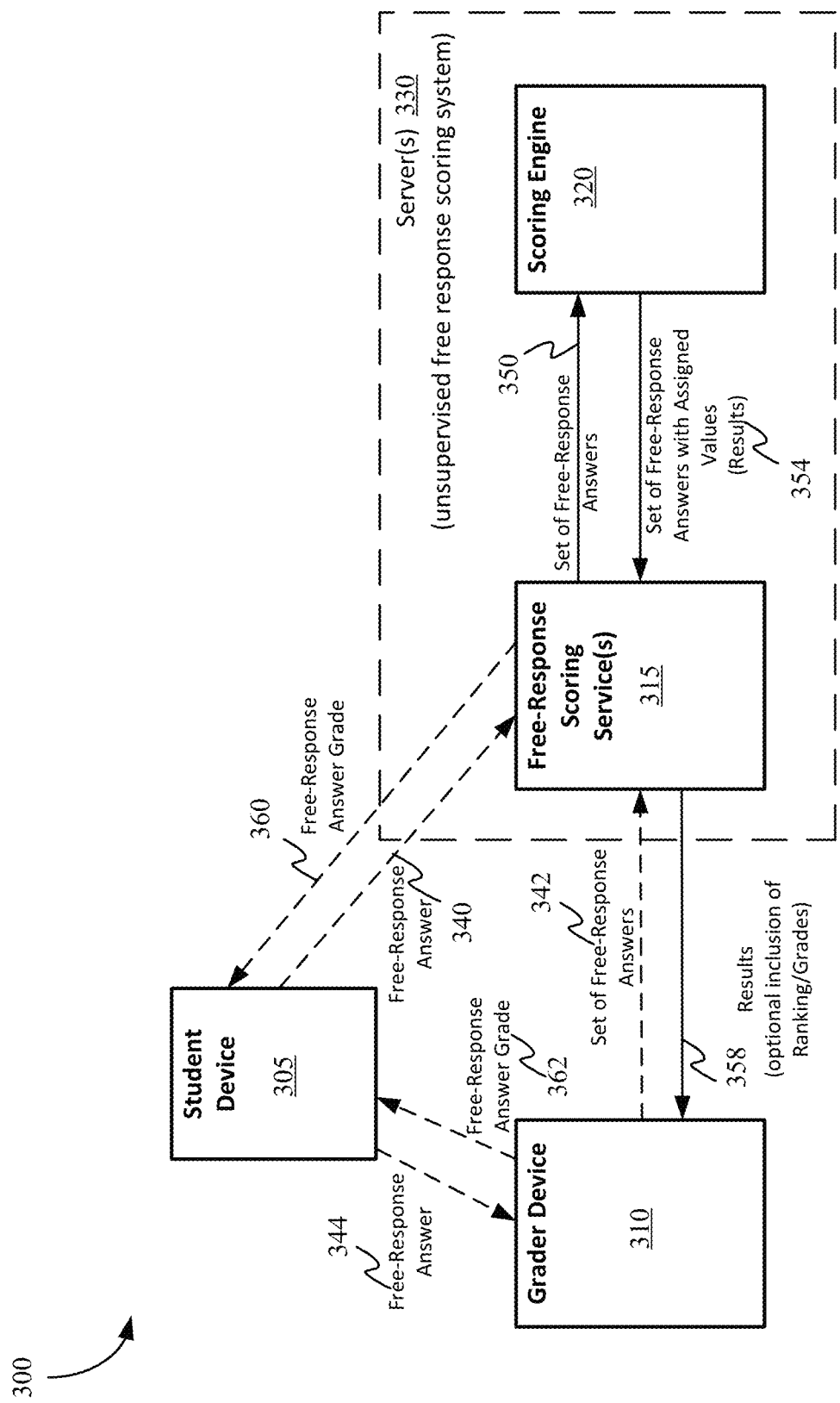
FIG. 3 illustrates an example implementation of an operational environment for unsupervised machine scoring of free-response answers.

FIG. 3 illustrates an example implementation of an operational environment for unsupervised machine scoring of free-response answers. Referring to FIG. 3, operational environment 300 can include a student computing device 305, a grader computing device 310, and unsupervised free-response scoring service(s) 315. Service(s) 315 provides access to functionality of the unsupervised free-response scoring operations of a scoring engine 320. In some cases, the service(s) 315 can be integrated with various systems or applications. For example, the service(s) 315 can be integrated with online exam software, learning management system, or online education courses (e.g., massive open online courses (MOOCS)). In some cases, the service(s) 315 can be made available on a website or deployed as a stand-alone application.

In the example implementation, the service(s) 315 can receive a set of free-response answers. The set of free-response answers may be received through a variety of channels and in a number of ways. For example, a user (such as, but not limited to, a student, educator, or designated grader) may scan and/or upload one or more free-response answers through a submission portal or other interface to the service(s) 315. In some cases, the submission portal or other interface is accessible through an Internet browser executing on a user device.

In some cases, the free-response answers may be directly turned in to the educator (or other designated grader), for example, via email or in-person. The educator (or other designated grader) can then upload each free-response answer to the service(s) 315 as a set of free-response answers. In some cases, the free-response answers may be typed separately and then uploaded to the service(s) 315 by a student responding to the question.

As another example, a student, using the student computing device 305, may complete and submit answers to an exam via a website or application for online testing. In some cases, each free-response answer can then be communicated by the online testing website or online testing application to the service(s) 315. In some cases, each free-response answer can first be communicated by the online testing website or online testing application to the grader computing device 310 (directly—such as by a push operation—or upon access to a storage resource/the online testing website/application by the grader computing device 310). The grader computing device 310 can then communicate a set of free-response answers (e.g., the free-response answers from all students taking the exam) to the service(s) 315.

As another example, an unsupervised free-response scoring application or application that includes an unsupervised free-response scoring feature can be used to directly provide an exam and collect answers. A student, using the student computing device 305, may access and complete that exam using that application or a website providing a portal to an online version of the application, which includes or communicates with service(s) 315.

As can be seen from the provided examples, there may be two scenarios in which free-response answers are received by the service(s) 315. In one scenario, a free-response answer 340 is being sent to the service(s) 315 directly from the student computing device 305. In this first scenario, a student taking an exam submits free-response answers to the service(s) 315 for grading. The set of free-response answers then includes each free-response answer received in this manner.

In the second scenario, a set of free-response answers 342 is being sent to the service(s) 315 from the grader computing device 310. In this second scenario, each student taking an exam submits free-response answers to the educator (or other designated grader) for grading (directly or via a secondary testing application) and the educator (or designated grader) communicates the set of free-response answers to the service(s) 315. For example, the grader computing device 310 can receive free-response answer 344 from student computing device 305. The free-response answers received by the grader computing device 310 are sent to the free-response scoring service(s) 315 as the set of free-response answers 342 in a group together or as each answer is received.

In the first and second scenarios described above, as illustrated in FIG. 3, the free-response answer(s) (e.g., free-response answer 340 or the set of free-response answers 342) received by the service(s) 315 are processed to provide an unsupervised free-response score.

A set of free-response answers 350 may be communicated via the service(s) 315 to scoring engine 330 for the unsupervised free-response scoring. Scoring engine 330 includes hardware processor(s) and storage storing software that is executed on the hardware processor(s). As discussed in further detail with respect to the processes illustrated in FIG. 4, the scoring engine 330 can be used to perform unsupervised free-response scoring using word embeddings and various operations with respect to the set of free-response answers 350 to identify commonality content and similarity values for free-response answers with respect to the commonality content (e.g., for results 354).

In some cases, the results 354 can be ranked and/or sorted. For example, the set of free-response answers can be ranked and/or sorted based on varying degrees of "correctness." The ranking and/or sorting can be performed using the assigned similarity values and the logic that "right" or "good" answers will look similar, as they will all contain the same or similar elements, and "wrong" answers will look different from "right" or "good" answers and will be "wrong" in different ways.

In some cases, the corresponding assigned similarity values can be converted into other scores or other assessment metric, such as Z-scores or other standardized scores. The Z-scores can be converted into a grading scale.

The service(s) 315 can provide a ranking and/or grades 358 for the set of free-response answers to the grader computing device 310. In some cases, the educator (or designated grader) may then review the ranking and/or grades 358 for the set of free-response answers as a tool to aid in the grading process, allowing them to adjust the ranking and/or grades of machine-scored free-response answers, if necessary.

In some cases, the educator (or designated grader) provides a grade or ranking for each free-response answer to the corresponding student. For example, after the educator (or designated grader) reviews the ranking and/or grades 358 for the set of free-response answers, the educator (or designated grader) can, via the grader computing device 310, communicate a free-response answer grade 362 to the student computing device 305.

In some cases, a grade or ranking for each free-response answer can be provided directly to the corresponding student. For example, the service(s) 315 can communicate a free-response answer grade 360 to the student computing device 305.

Aspects of service(s) 315 (and operations of scoring engine 320) may themselves be carried out on a user computing device (e.g., a student computing device 305, a grader computing device 310) and/or may be performed at a designated system (e.g., server(s) 330) which can be embodied as described with respect to computing system 800 as shown in FIG. 8. Accordingly, while service(s) 315 and scoring engine 320 are shown and described as being executed at a separate system (e.g., by server(s) 330), aspects of the service(s) 315 and scoring engine 320 (which collectively can be referred to herein as "scoring services") may be implemented as components on more than one device or even locally at a user device. In some implementations, some aspects of the unsupervised free-response scoring are performed at a user computing device (e.g., the student computing device 305 or the grader computing device 310), while other aspects may be performed, at least in part, at server(s) 330 (e.g., operations requiring more computing resources than available at a user computing device may be performed by other computing systems).

Communication to and from service(s) 315 may be carried out, in some cases, via application programming interfaces (APIs). An API is an interface implemented by a program code component or hardware component (hereinafter "API-implementing component") that allows a different program code component or hardware component (hereinafter "API-calling component") to access and use one or more functions, methods, procedures, data structures, classes, and/or other services provided by the API-implementing component. An API can define one or more parameters that are passed between the API-calling component and the API-implementing component. The API is generally a set of programming instructions and standards for enabling two or more applications to communicate with each other and is commonly implemented over the Internet as a set of Hypertext Transfer Protocol (HTTP) request messages and a specified format or structure for response messages according to a REST (Representational state transfer) or SOAP (Simple Object Access Protocol) architecture.

Figure 4:
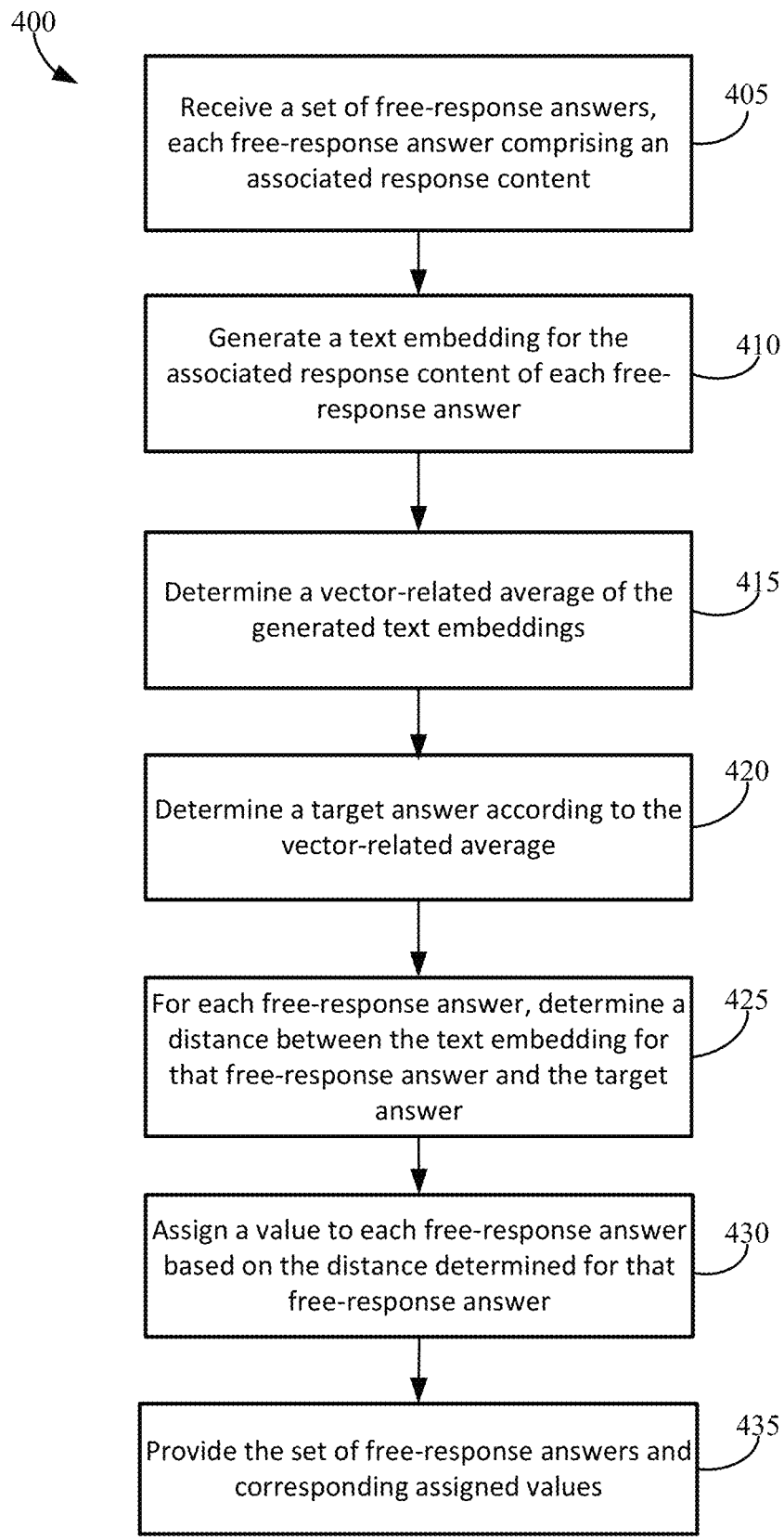
FIG. 4 illustrates an example implementation of a method for providing unsupervised machine scoring of free-response answers.

FIG. 4 illustrates an example implementation of a method for providing unsupervised machine scoring of free-response answers. Referring to FIG. 4, a scoring service, which may be implemented such as described with respect to service(s) 315 and scoring engine 320 of FIG. 3, performing processes, such as process 400, can be implemented by a scoring system, which can be embodied as described with respect to computing system 800 as shown in FIG. 8.

Some or all of process 400 may be executed at the scoring system as part of the scoring services (e.g., the scoring system may include all instructions to perform process 400). In some cases, process 400 may be executed entirely at a grader/educator's user device, for example as an offline version (e.g., the user device may include instructions to perform process 400). In some cases, process 400 may be executed in part at the user device, for example as an online version, while that user device (i.e., the grader's user device) is in communication with the scoring system to support the unsupervised machine scoring of free-response answers.

As part of process 400, the scoring system can receive (405) a set of free-response answers from one or more user devices. Each free-response answer of the set of free-response answers can include an associated response content.

In some cases, the one or more user devices can be a user device of a student. In this case, each student can draft a free-response answer and directly communicate that free-response answer to the scoring system. In some cases, the one or more user devices can be a user device of an educator (or the educator's designated grader). In this case, the educator (or designated grader) may collect each free-response answer in the set of free-response answers and submit the set of free-response answers to the scoring system.

The scoring system can generate (410) a text embedding for the associated response content of each free-response answer. An embedding refers to a vector representation of a word, phrase, or document that encodes its meaning. In particular, an embedding is a relatively low-dimensional, learned continuous vector representation, or space, into which high-dimensional vectors can be translated. Embeddings that are closer in the vector space are considered to be more similar in meaning. Any suitable means of embedding may be used for the content of the free-response answers.

The associated response content can be fed into the embedding algorithm, which then converts and assigns each text a numerical value within a vector space, producing an embedding. This vector space is comprised of n-dimensional features such that the text embeddings for free-response answers with similar content are found closer to each other in this space than those embeddings for answers with dissimilar content.

The text embedding can be generated using any suitable language model or embedding algorithm, such as Word2Vec, BERT, or RoBERTa. Global vector (also known as GloVe or glove) is another technique used to generate text embeddings. Glove is a technique for analyzing and grouping words based on semantic meaning, allowing text to be turned into word embeddings and thus understood by machines. Unlike other methods that rely on word vectors, glove techniques allow for global statistics rather than just local statistics (relying on immediate context to classify words). Word embeddings, or a learned representation of text wherein words with similar meanings can be represented similarly, often numerically as vectors, can be produced by this method to process text for semantic meaning in a way that can be understood by a computer.

In some cases, the text embeddings may be combined with additional processing such as the automated analysis of the essay for grammatical errors, numerically counting the number of words in the submitted free-response answer or assessing the submitted free-response answer for reading difficulty to produce more robust embeddings.

The scoring system can determine (415) a vector-related average of the generated text embeddings. The vector-related average is applied across the entire data set and not for clusters in the data set of the answers to a single question. The vector-related average can be based on any suitable identification of an average for multivariate data. For example, the vector-related average can be the centroid (e.g., identified by computing the mean of the vector space components of a data point in each dimension), the medoid (e.g., the data point that is least dissimilar from all of the other data points), or even the geometric median for the entire data set of the answers to a single question.

In some cases, a centroid is used in operation 415, with the centroid being the average, mathematical center, or center of gravity, for all of the generated text embeddings taken together.

In some cases, a medoid is used in operation 415, with the medoid being a representative object of a data set within the text embeddings whose average dissimilarity to all the objects is minimal.

The scoring system can determine (420) a target answer according to the vector-related average. The scoring system can use the vector-related average of the generated text embeddings for all the free-response answers and impute the location of a "correct" model answer. Here, the "correct" model answer can be considered the target answer.

Accordingly, operations 410, 415, and 420 can be used to determine commonality content such as described with respect to operation 210 of FIG. 2.

Thus, advantageously, instead of requiring a model answer, the scoring system can compare a set of free-response answers to infer the qualities of the target answer, relying on the logic that "right" or "good" answers will look similar, as they will all contain the same or similar elements, and "wrong" answers will look different from "right" or "good" answers and will be "wrong" in different ways.

In some cases, the centroid can be determined to be the target answer. In some cases, the medoid can be determined to be the target answer. The medoid would be the free-response answer that is closest to the centroid.

For each free-response answer of the set of free-response answers, the system can determine (425) a distance between the text embedding for that free-response answer and the target answer; and assign (430) a value to each free-response answer based on the distance determined for that free-response answer. The distance can be calculated in any suitable manner, such as through the calculation of Euclidean distance or other measures of similarity. In some cases, the value assigned to each free-response answer is the determined distance. In some cases, the determined distance is further processed to determine the value assigned to each free-response answer.

The distance of an embedding of a free-response answer from the vector-related average can serve as a proxy for its quality. The closer a free-response answer is to the vector-related average, the "better" it may be. In some cases, the distance can be measured from a nearby location. For example, if it is determined that the target answer is the best answer to appear in an actual free-response answer, the medoid would be the point against which others were measured. Accordingly, operations 425 and 430 can respectively be used to determine an amount of similarity and to assign a similarity value such as described with respect to operations 215 and 220 of FIG. 2.

The scoring system can provide (435) the set of free-response answers and corresponding assigned values. The set of free-response answers and corresponding assigned values can be provided in a variety of ways and include various information.

In some cases, the corresponding assigned similarity values can be converted into other scores or other assessment metric, such as Z-scores or other standardized scores. The Z-score can act as a bridge to translate an embedding's relationship to others into a more standard grade scale or scoring metric. In some cases, the resulting Z-scores may be translated into conventional letter grades. In some cases, the resulting Z-scores may be translated and sorted into alternative groups, such as Pass/Fail, representative grades, or a numerical scoring system.

As an example, though there is no generally agreed upon translation between z-scores and traditional letter grades, it is customary for educators to settle upon particular grading curves. That is, the mean score may be set to a B−, corresponding to a Z-score of 0, and so on. Translations could also be made to alternative grading scales, such as pass-fail, where a pass is a Z-score over some value X.

In some cases, the set of free-response answers and the corresponding assigned similarity values can be ranked and/or sorted. For example, the set of free-response answers can be ranked and/or sorted based on varying degrees of "correctness." The ranking and/or sorting can be performed using the assigned similarity values and the logic that "right" or "good" answers will look similar, as they will all contain the same or similar elements, and "wrong" answers will look different from "right" or "good" answers and will be "wrong" in different ways.

In some cases, the set of free-response answers and corresponding assigned values can be ranked and presented to an educator (or designated grader) for review. The educators/graders can easily reorder the ranked list of machine scored free-response answers. In some cases, the reordering can be accompanied by an automatic rescoring of the relevant free-response answers. For example, a grader can be presented with a screen consisting of multiple columns corresponding to grade markings (e.g., A, B, C, D, and F) with answers occupying the columns based on their machine score. Graders could then move answers up or down within a column or across columns such that their order represented their relative quality. A free-response answer's position in this ordering can then determine its score. Alternatively, graders can enter a score directly, absent the need to manipulate an answer's position, prompting an automated reordering of the list as needed.

In a specific example of process 400, a computer system for implementing a method of grading essays or written responses within a population of responses absent a pre-existing model answer can produce a text embedding for each answer or response from a population of answers or responses input into the system during operation 410. A centroid can then be found for the population of text embeddings during operation 415; and a model answer can be imputed from that centroid during operation 420. Then, for operation 425, a distance can be measured between each answer's text embedding and that of the model answer. These distances can be translated into grades or rankings (e.g., using operation 430).

Accordingly, a method can include deriving a text embedding for each essay or short answer that captures as much of the relevant information as possible; finding the centroid for all of the text embeddings in the inputted population of answers; using this centroid to impute a model answer; and measuring the distance between each answer's embedding and the model answer. The method can further include conversion of each answer's distance from the centroid into Z-scores for the population of answers; and translation of the Z-scores into some known grading scale. The method can yet further include the ordering of the submitted answers according to their grades or markings; and the presenting of the ordered list to a human grader or graders for review.

One application of the methods described herein is to apply the method for use with factual questions—where there is only one right answer. For example, one could apply the method for use in the law exam traditional "issue-spotting" exam; the program will rank similar answers that spot the same, or similar issues as "right" or "good" answers, where as those responses that do not will be ranked lower.

FIGS. 5A-5I illustrate example scenarios for unsupervised machine scoring of free-response answers from the perspective of an educator or grader; and FIGS. 6A-6E illustrate example scenarios for unsupervised machine scoring of free-response answers from the perspective of a student.

Figure 5A:
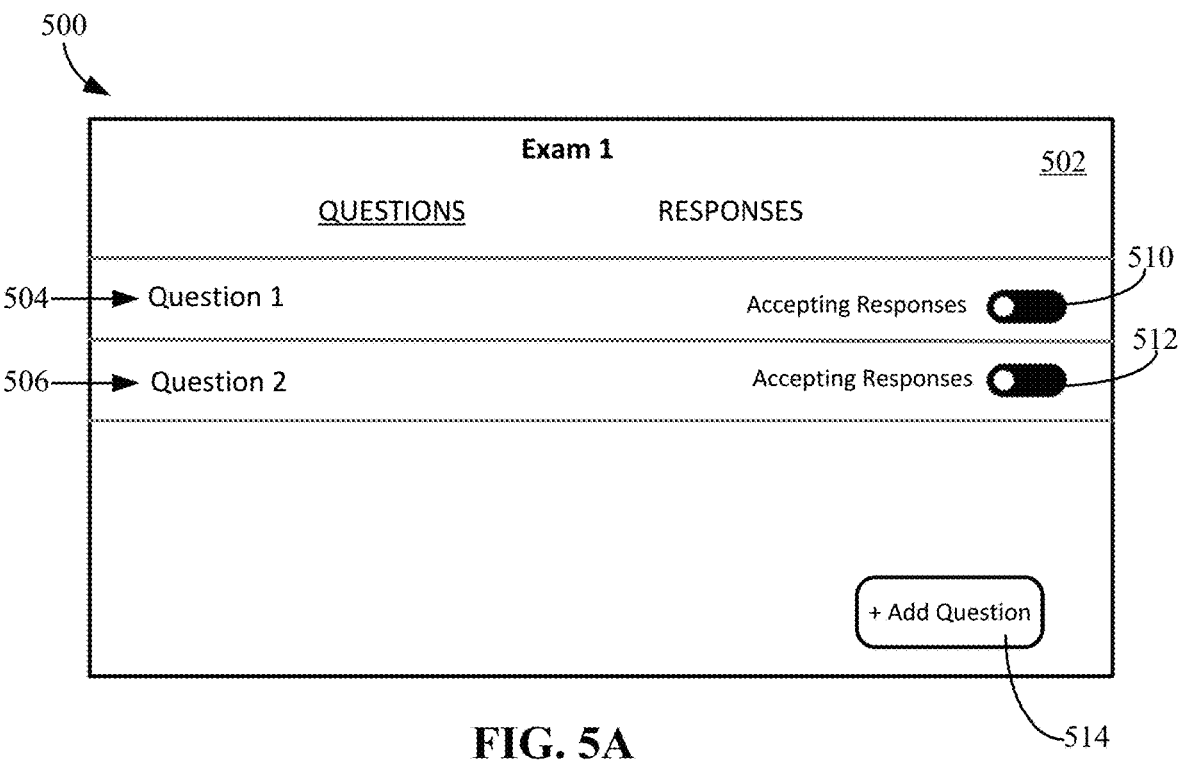

Referring to FIG. 5A, an educator may open a user interface 502 of an exam application 500 that includes a feature for, or communicates with an application providing, unsupervised machine scoring of free-response answers on their computing device. The exam application 500 may run directly on the computing device or via a browser running on the computing device. The computing device can be any computing device such as, but not limited to, a laptop computer, a desktop computer, a tablet, a personal digital assistant, a smart phone, a smart television, a gaming console, wearable device, and the like.

Through the user interface 502, the educator can create an exam (e.g., Exam 1) having free-response questions to be graded by the described unsupervised machine scoring of free-response answers.

In the illustrative example of FIG. 5A, the educator has created two questions (e.g., Question 1 504 and Question 2 506). Each question has a corresponding toggle to allow the educator to accept responses (e.g., toggle 510 and toggle 512). Here, while the educator is creating the exam, each toggle (e.g., toggle 510 and toggle 512) is in the off position and the educator is not accepting any responses.

The educator can add additional questions to the exam by selecting the add question command 514. When the educator selects the add question command 514, the next question in the exam can be created, as shown in FIG. 5B.

Figure 5B:
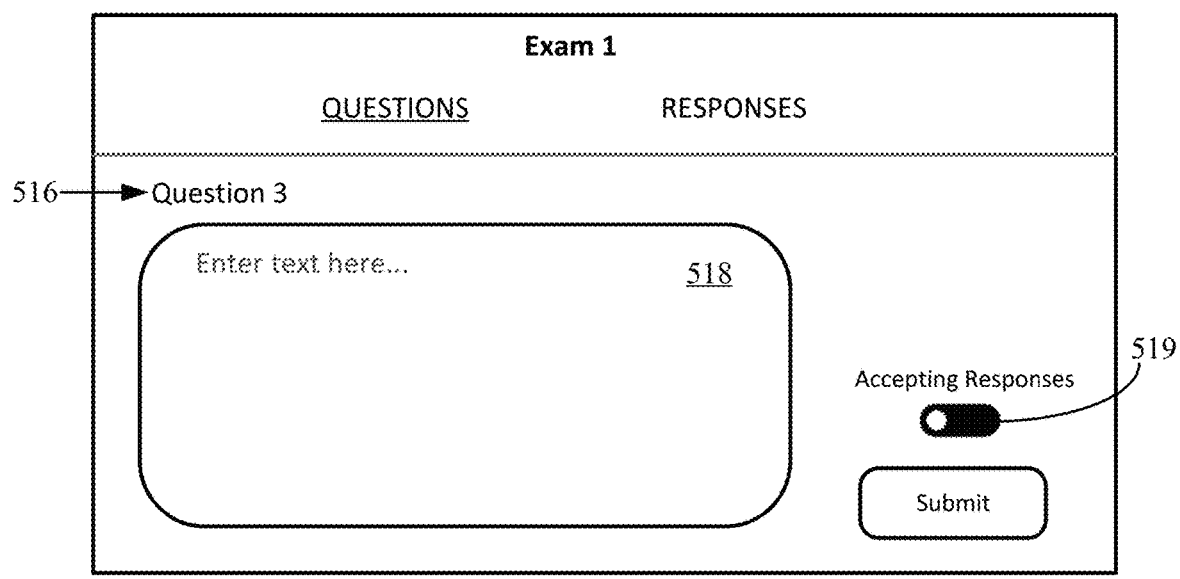

In FIG. 5B, the educator can create the next question, Question 3 516 by typing the question prompt in text box 518. The educator can indicate whether to accept responses to Question 3 516 by using the corresponding toggle 519.

Figure 5C:
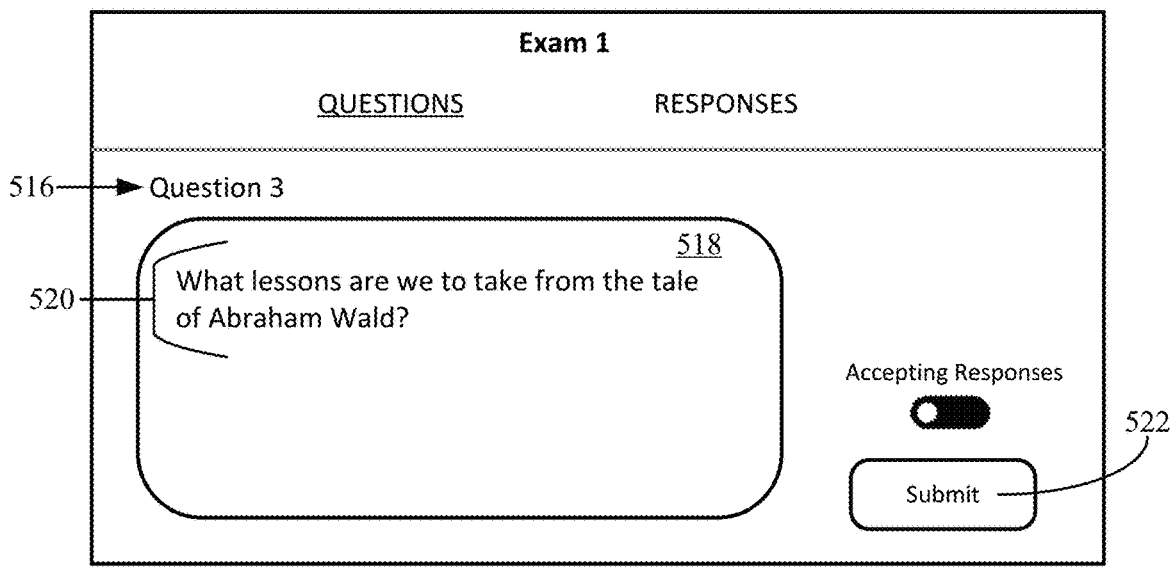

As shown in FIG. 5C, the educator has created the question prompt 520 for Question 3 516. Question prompt 520 states "What lessons are we to take from the tale of Abraham Wald?" Once the educator is done creating the question prompt 520 for Question 3 516, the user can select a submit command 522 to add Question 3 516 to the exam.

Figure 5D:
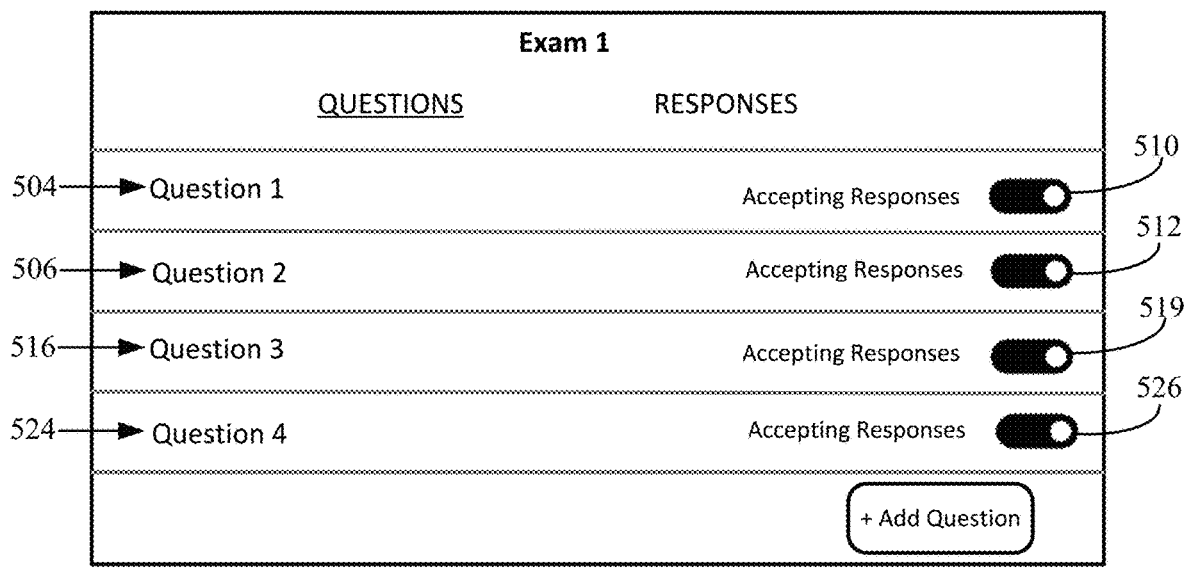

As shown in FIG. 5D, the educator has created four questions for the exam (e.g., Question 1 504, Question 2 506, Question 3 516, and Question 4 524). When the educator is ready to start accepting answers to the exam questions, the educator can switch each toggle (e.g., toggle 510, toggle 512, toggle 519, and toggle 526) to the on position. In the illustrative example of FIG. 5D, each toggle is in the on position, indicating that the educator has started the exam.

Figure 6A:
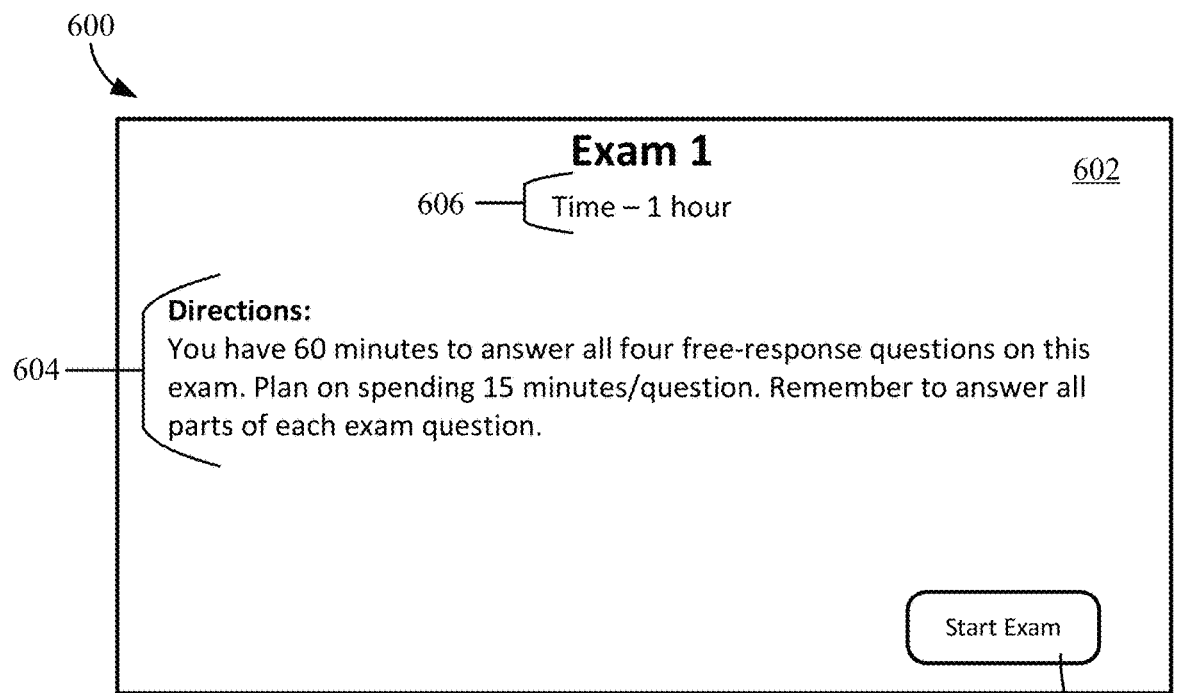

Referring to FIG. 6A, a student (e.g., student 1) may open a user interface 602 of an exam application 600 (which may be associated with or the same as exam application 500). The application 600 may run directly on the computing device or via a browser running on the computing device. The computing device can be any computing device such as, but not limited to, a laptop computer, a desktop computer, a tablet, a personal digital assistant, a smart phone, a smart television, a gaming console, wearable device, and the like.

Through the user interface 602, student 1 can take an exam (e.g., Exam 1) having four free-response questions. Each question answered by the student can then be graded by the described unsupervised machine scoring system. In the illustrative examples of FIGS. 6A-6E, student 1 is taking the exam prepared by the educator as described with respect to FIGS. 5A-5D.

As shown in FIG. 6A, before the exam begins, student 1 is given the directions 604 to the exam, as well as the time 606 allowed to take the exam. Here, the time 606 allowed for the exam is "1 hour" and the directions 604 state "You have 60 minutes to answer all four free-response questions on this exam. Plan on spending 15 minutes/question. Remember to answer all parts of each exam question." When student 1 is ready to begin the exam, student 1 can select the start exam command 608 and the time 606 will begin.

Figure 6B:
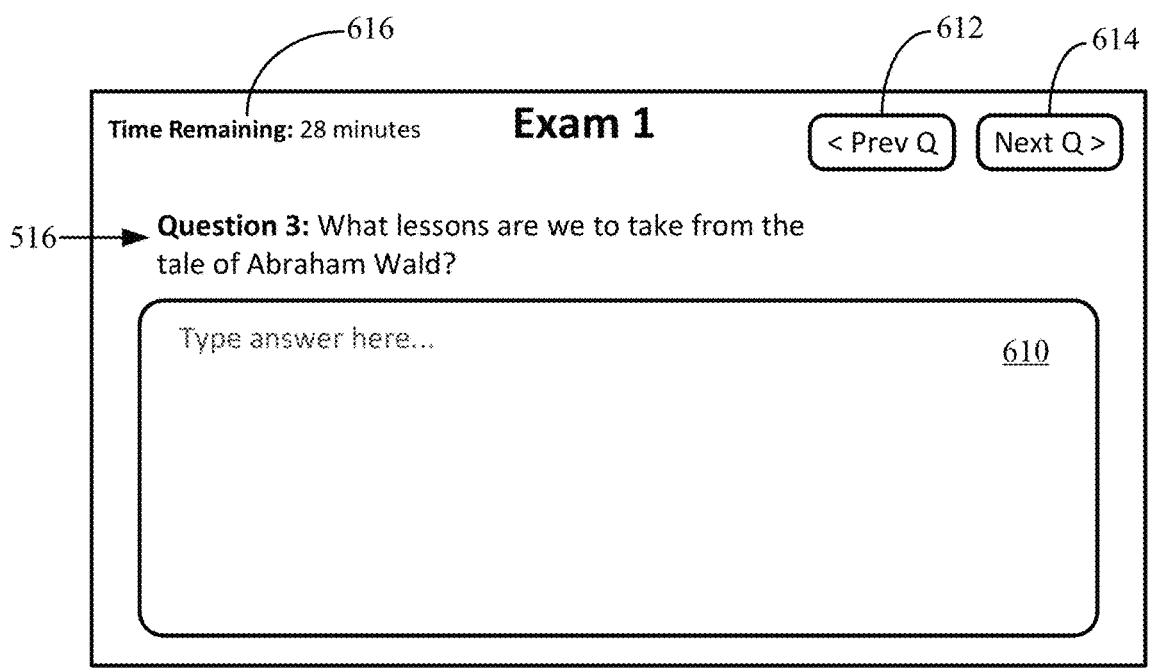

As shown in FIG. 6B, 32 minutes into the exam, student 1 is on Question 3 (e.g., Question 3 516 of FIGS. 5A-5D). In the illustrative example of FIG. 6B, student 1 is provided a text box 610 to enter a free-response answer to Question 3 516. Student 1 can switch to a different question in the exam by selecting a previous question icon 612 or a next question icon 614. Additionally, student 1 is shown how much time is remaining 616 in the exam. Here, the time remaining 616 is 28 minutes.

Figure 6C:
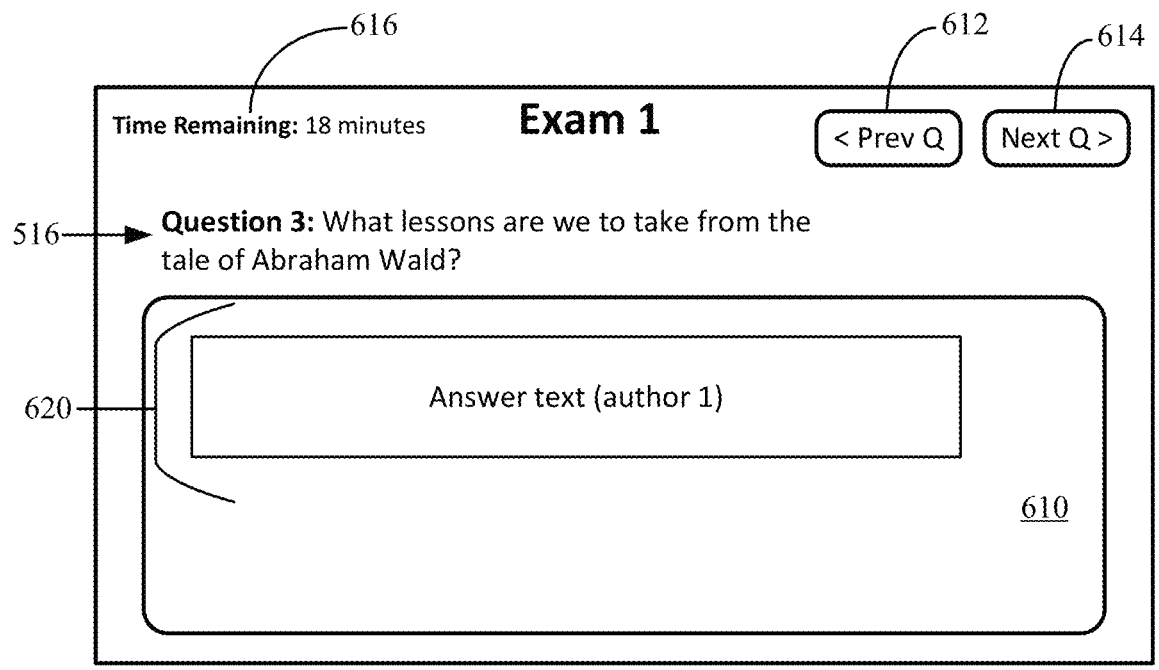

As shown in FIG. 6C, student 1 has entered a free-response answer 620 in the text box 610 for Question 3 516. As can be seen, the time remaining 616 after student 1 answered Question 3 516 is now 18 minutes.

Figure 6D:
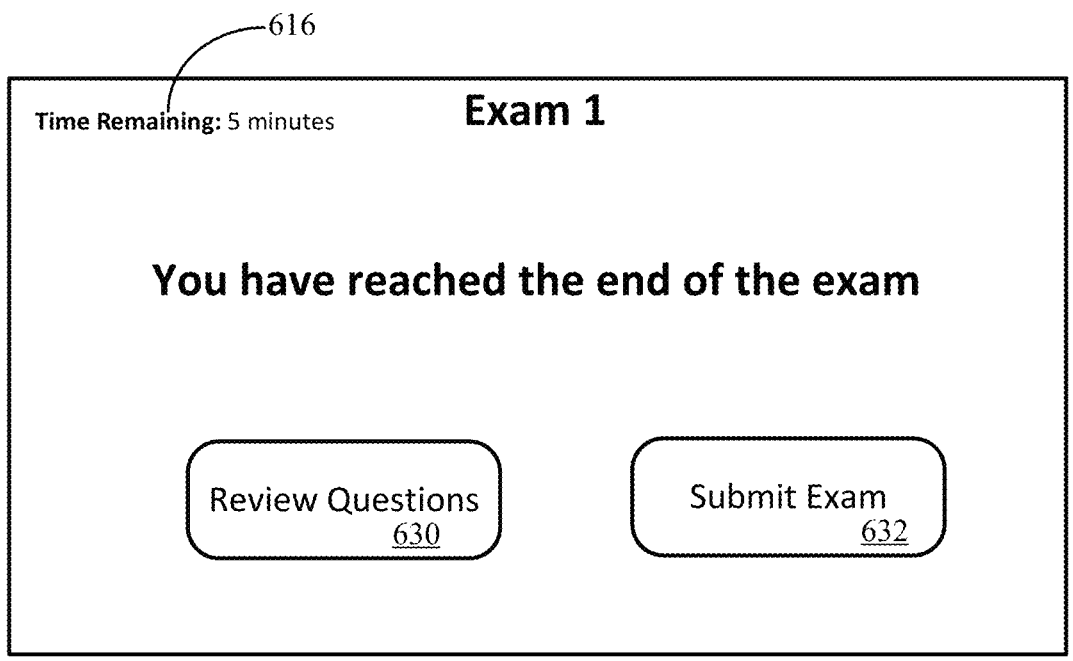

As shown in FIG. 6D, student 1 has reached the end of the exam. As can be seen, the time remaining 616 after student 1 answered each question is 5 minutes. In the illustrative example of FIG. 6D, student 1 is provided options of reviewing the questions or submitting the exam. Student 1 can review the questions by selecting a review questions command 630 or submit the exam by selecting a submit exam command 632. Once student 1 selects the submit exam command 632, student 1's free-response answers are ready for unsupervised machine scoring.

Returning now to FIGS. 5A-5I, in the illustrative example, the exam has ended, and the educator has received all responses from the students taking the exam, including student 1. As shown in FIG. 5E, the educator has received 15 responses for each of the exam questions (e.g., Question 1 504, Question 2 506, Question 3 516, and Question 4 524). In the illustrative example of FIG. 5E, the educator can see that the 15 students have all answered the questions.

The educator, operating as a grader, can choose to have fewer than all exam questions graded through unsupervised machine scoring, for example by selecting a corresponding grade command (e.g., grade command 540, grade command 542, grade command 544, or grade command 546); otherwise, the educator can select a grade all command 548 to initiate the unsupervised machine scoring. Upon receipt of a selection of any of these commands, the exam application 500 communicates the set of response answers to the scoring service (e.g., as described with respect to system 105 of FIG. 1 and service(s) 315 of FIG. 3).

Figure 5F:
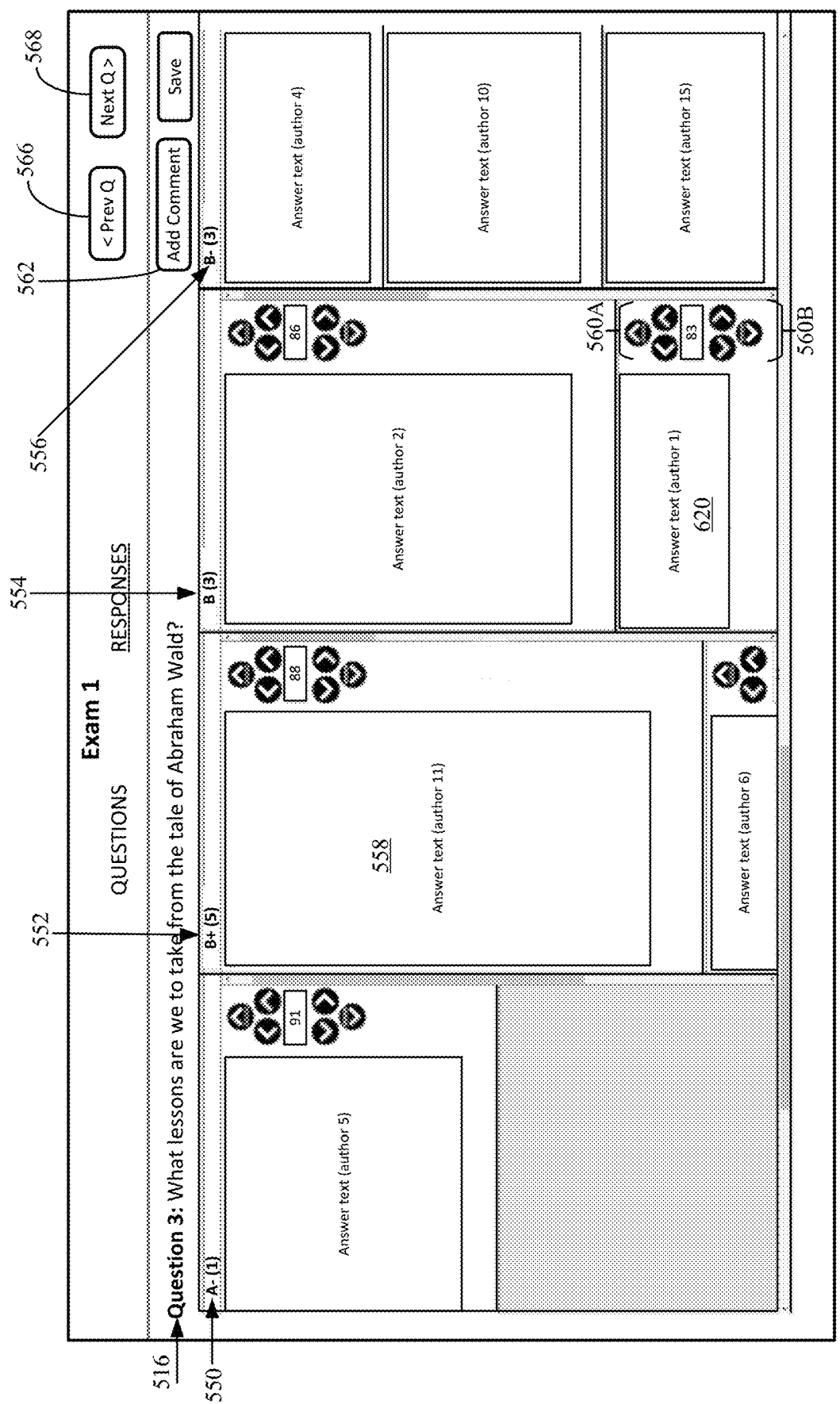

In the illustrative example of FIG. 5F, Question 3 516 has been graded and the set of free-response answers with assigned values are presented to the educator (e.g., after operations 200 as described with respect to FIG. 2 or operations 400 as described with respect to FIG. 4). As shown in FIG. 5F, the free-response answers are presented in a set of columns associated with letter grades with answers occupying the columns based on their machine score. Each column in the set of columns includes a label indicating the letter grade and number of free-response answers assigned that letter grade. Here, label 550 indicates that "(1)" free-response answer has been assigned the letter grade of "A−;" label 552 indicates that "(5)" free-response answers have been assigned the letter grade of "B+;" label 554 indicates that "(3)" free-response answers have been assigned the letter grade of "B;" label 556 indicates that "(3)" free-response answers have been assigned the letter grade of "B−."

As can be seen, free-response answer 620 (i.e., student 1's response to Question 3 516 as described with respect to FIG. 6C) has been assigned a score of "83" and is included in the column with label 554 indicating that free-response answer 620 has been assigned the letter grade of "B". As another example, free-response answer 558 has been assigned a score of "88" and is included in the column with label 552 indicating that free-response answer 558 has been assigned the letter grade of "B+".

Once the educator is provided the set of free-response answers with assigned values, the educator can further process the answers. For example, the educator can review the answers and rearrange the answers as necessary. In some cases, the educator can rearrange the free-response answers using arrow icons associated with each free-response answer (e.g., arrow icons 560A and 560B associated with free-response answer 620). For example, the educator can move answers up or down within a column or across columns such that free-response answer order represents their relative quality. A free-response answer's position in this ordering can then determine its score. In some cases, the reordering can be accompanied by an automatic rescoring of the relevant free-response answers. Alternatively, educators can enter a score directly, absent the need to manipulate an answer's position, prompting an automated reordering of the list as needed.

As another example, the educator can add a comment to any of the free-response answers by selecting an add comment command 562. Additionally, the educator can review a different question in the exam by selecting a previous question icon 566 or a next question icon 568.

Figure 5G:
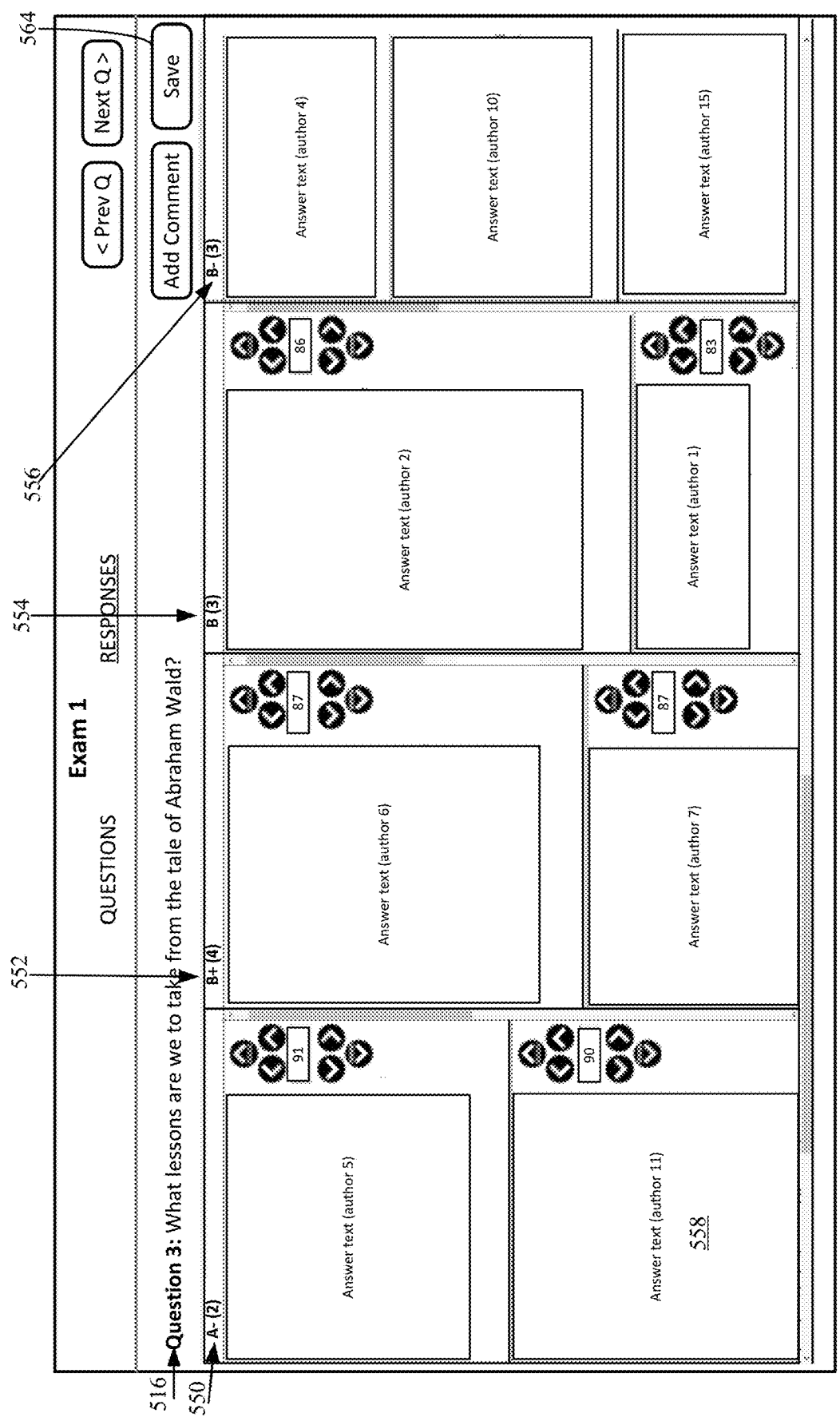

In the illustrative example of FIG. 5G, the educator has reviewed and edited the set of free-response answers for Question 3 516. As shown in FIG. 5G, the score for free-response answer 558 (having been assigned a score of "88" and included in the column with label 552 indicating the letter grade of "B+" in FIG. 5F) has been adjusted. The educator adjusted the score from an "88" to a "90". Thus, the free-response answer 558 has been moved to the column with label 550 indicating that free-response answer 558 has now been assigned the letter grade of "A−".

The labels for each column in the set of columns have also been updated accordingly. Here, label 550 indicates that there are now "(2)" free-response answers that have been assigned the letter grade of "A−;" label 552 indicates that there are now "(4)" free-response answer has been assigned the letter grade of "B+." Label 554 and label 556 have stayed the same.

Once the educator is satisfied with the scores, the educator can select the save command 564 and the current scores are automatically saved, and the scores for each student's free-response answers can be provided in a list for the educator, as shown in FIG. 5H and FIG. 5I.

In the illustrative example of FIG. 5H, the educator is shown the scores for each student's free-response answer to Question 3 516. In the illustrative example of FIG. 5I, the educator is shown the scores for the entire exam.

In FIGS. 5H and 5I, the educator can select a sort command 570 to sort the scores. For example, the educator can select the sort command 570 to sort any of the scores from highest grade to lowest grade or to sort the scores from lowest grade to highest grade. In some cases, the educator can select the sort command 570 to sort the scores based on the name of the student (e.g., in alphabetical order by last name of each student).

In FIGS. 5H and 5I, the educator can select a convert command 572 to convert the scores into letter grades. For example, the educator can select the convert command 572 to convert the "Exam Score" in FIG. 5I to a corresponding grade letter.

Returning now to FIG. 6E, in the illustrative example, the exam has been scored, and student 1 has received grades for each of the exam questions, as well as an overall score. As shown in FIG. 6E, student 1 received a score of "91" for Question 1 504, a score of "90" for Question 2 506, a score of "83" for Question 3 516, and a score of "87" for Question 4 524. The overall score 580 for Student 1 is an "88." Student 1 can select a review answers command 590 to return to the full free-response answers student 1 submitted for each question.

FIGS. 7A and 7B illustrate another example scenario for unsupervised machine scoring of free-response answers from the perspective of an educator or grader. FIGS. 7A and 7B show how an educator can upload answers for unsupervised machine scoring.

In some cases, free-response answers to an exam may be provided directly to the educator, for example, when using a different exam application for administering a test—or even when no specific exam software is used. The educator can then upload each free-response answer as part of a set of free-response answers.

Referring to FIG. 7A, an interface 700 is illustrated that includes an upload answers command 705. In some cases, the educator can upload the set of free-response answers individually for each exam question. In some cases, the educator can upload the set of free-response answers for every exam question at one time. Upon selection of the upload answers command 705, the educator's application can initiate the operations 200 as described with respect to FIG. 2 or operations 400 as described with respect to FIG. 4. However, in some cases, such as illustrated in FIG. 7B, an intermediate step can be provided to enable the grader to select fewer than all questions to be scored.

As shown in the illustrative scenario of FIG. 7B, the educator has received 53 responses for each of the exam questions (e.g., Question 1 710, Question 2 715, Question 3 720, and Question 4 725).

As previously described, the educator/grader can choose to have each exam question graded through unsupervised machine scoring separately or have all the exam questions graded through the unsupervised machine scoring at the same time. If the educator chooses to have each exam question graded separately, the educator can select a corresponding grade command (e.g., grade command 740, grade command 742, grade command 744, or grade command 746). If the educator chooses to have all the exam questions scored, the educator can select a grade all command 748.

FIG. 8 illustrates components of a computing system that may be used in certain embodiments described herein. Referring to FIG. 8, system 800 may be implemented within a single computing device or distributed across multiple computing devices or sub-systems that cooperate in executing program instructions. The system 800 can include one or more blade server devices, standalone server devices, personal computers, routers, hubs, switches, bridges, firewall devices, intrusion detection devices, mainframe computers, network-attached storage devices, and other types of computing devices. The system hardware can be configured according to any suitable computer architectures such as a Symmetric Multi-Processing (SMP) architecture or a Non-Uniform Memory Access (NUMA) architecture.

The system 800 can include a processing system 810, which may include one or more processors and/or other circuitry that retrieves and executes software 820 from storage system 830. Processing system 810 may be implemented within a single processing device but may also be distributed across multiple processing devices or sub-systems that cooperate in executing program instructions.

Storage system(s) 830 can include any computer readable storage media readable by processing system 810 and capable of storing software 820. Storage system 830 may be implemented as a single storage device but may also be implemented across multiple storage devices or sub-systems co-located or distributed relative to each other. Storage system 830 may include additional elements, such as a controller, capable of communicating with processing system 810. Storage system 830 may also include storage devices and/or sub-systems on which data is stored. System 800 may access one or more storage resources in order to access information to carry out any of the processes indicated by software 820.

Software 820, including routines for performing processes, such as process 200 described with respect to FIG. 2 and process 400 described with respect to FIG. 4, may be implemented in program instructions and among other functions may, when executed by system 800 in general or processing system 810 in particular, direct the system 800 or processing system 810 to operate as described herein.

In embodiments where the system 800 includes multiple computing devices, in some cases, the computing devices can be installed at geographically distributed locations. In other cases, the multiple computing devices can be installed at a single geographic location, such as a server farm or an office.

A communication interface 840 may be included, providing communication connections and devices that allow for communication between system 800 and other computing systems (not shown) over a communication network or collection of networks (not shown) or the air.

In some embodiments, system 800 may host one or more virtual machines.

Alternatively, or in addition, the functionality, methods, and processes described herein can be implemented, at least in part, by one or more hardware modules (or logic components). For example, the hardware modules can include, but are not limited to, application-specific integrated circuit (ASIC) chips, field programmable gate arrays (FPGAs), system-on-a-chip (SoC) systems, complex programmable logic devices (CPLDs) and other programmable logic devices now known or later developed. When the hardware modules are activated, the hardware modules perform the functionality, methods and processes included within the hardware modules.

It should be understood that as used herein, in no case do the terms "storage media," "computer-readable storage media" or "computer-readable storage medium" consist of transitory carrier waves or propagating signals. Instead, "storage" media refers to non-transitory media.

Although the subject matter has been described in language specific to structural features and/or acts, it is to be understood that the subject matter defined in the appended claims is not necessarily limited to the specific features or acts described above. Rather, the specific features and acts described above are disclosed as examples of implementing the claims and other equivalent features and acts are intended to be within the scope of the claims.

What is claimed is:

1. A method comprising:
 receiving, at a computing system, a set of free-response answers, each free-response answer of the set of free-response answers comprising an associated response content;
 generating a target answer from the set of free-response answers, wherein generating the target answer comprises: determining, by the computing system, from the associated response content of the set of free-response answers, a commonality content by identifying semantically related response content from the set of free-response answers by:

generating a text embedding for the associated response content of each free-response answer;
determining at least one of a centroid and a medoid of the generated text embeddings; and
determining the target answer according to the at least one of the centroid and the medoid of the generated text embeddings;
scoring the set of free-response answers against the target answer by:
for each free-response answer of the set of free-response answers, determining by the computing system, an amount of similarity between the associated response content for that free-response answer and the commonality content by determining a distance between the text embedding for that free-response answer and the target answer; and
assigning, by the computing system, a similarity value from the amount of similarity to that free-response answer by assigning a value to each free-response answer based on the distance determined for that free-response answer; and
providing the set of free-response answers and their corresponding assigned similarity values indicating the scoring of that free-response answer against the target answer.

2. The method of claim 1, further comprising:
determining a ranked order of the set of free-response answers based on the assigned similarity values,
wherein the set of free-response answers having the corresponding assigned similarity values are provided in the ranked order.

3. The method of claim 1, further comprising:
converting the assigned similarity values into Z-scores for each free-response answer in the set of free-response answers; and
translating the Z-scores to a grading scale.

4. A system comprising:
a processing system;
a storage system; and
instructions stored on the storage system that when executed by the processing system direct the processing system to at least:
receive a set of free-response answers, each free-response answer of the set of free-response answers comprising an associated response content;
generate a target answer from the set of free-response answers, wherein the instructions to generate the target answer direct the processing system to: determine from the associated response content of the set of free-response answers, a commonality content by identifying semantically related response content from the set of free-response answers by:
generating a text embedding for the associated response content of each free-response answer;
determining at least one of a centroid and a medoid of the generated text embeddings; and
determining the target answer according to the at least one of the centroid and the medoid of the generated text embeddings;
score the set of free-response answers against the target answer by:
for each free-response answer of the set of free-response answers, determining an amount of similarity between the associated response content for that free-response answer and the commonality content by determining a distance between the text embedding for that free-response answer and the target answer; and
assigning a similarity value from the amount of similarity to that free-response answer by assigning a value to each free-response answer based on the distance determined for that free-response answer; and
provide the set of free-response answers and their corresponding assigned similarity values indicating the scoring of that free-response answer against the target answer.

5. The system of claim 4, wherein the target answer is a free-response answer from the set of free-response answers.

6. The system of claim 4, wherein the instructions further direct the processing system to:
determine a ranked order of the set of free-response answers based on the assigned similarity values,
wherein the set of free-response answers having the corresponding assigned similarity values are provided in the ranked order.

7. A computer-readable storage medium having instructions stored thereon that, when executed by a processing system, perform a method comprising:
receiving a set of free-response answers, each free-response answer of the set of free-response answers comprising an associated response content;
generating a target answer from the set of free-response answers, wherein generating the target answer comprises: determining, from the associated response content of the set of free-response answers, a commonality content by identifying semantically related response content from the set of free-response answers by:
generating a text embedding for the associated response content of each free-response answer;
determining at least one of a centroid and a medoid of the generated text embeddings; and
determining the target answer according to the at least one of the centroid and the medoid of the generated text embeddings;
scoring the set of free-response answers against the target answer by:
for each free-response answer of the set of free-response answers, determining an amount of similarity between the associated response content for that free-response answer and the commonality content by determining a distance between the text embedding for that free-response answer and the target answer; and
assigning a similarity value from the amount of similarity to that free-response answer by assigning a value to each free-response answer based on the distance determined for that free-response answer; and
providing the set of free-response answers and their corresponding assigned similarity values indicating the scoring of that free-response answer against the target answer.

8. The medium of claim 7, wherein the method further comprises:
converting the assigned similarity values into Z-scores for each free-response answer in the set of free-response answers; and
translating the Z-scores to a grading scale.

* * * * *